(12) United States Patent
Guillouard et al.

(10) Patent No.: US 7,558,347 B2
(45) Date of Patent: Jul. 7, 2009

(54) METHOD AND DEVICE FOR SELECTING AN ANTENNA FOR RECEIPT OF A MULTI-CARRIER SIGNAL

(75) Inventors: Samuel Guillouard, Chantepie (FR); Patrick Lopez, Livre sur Changeon (FR); Vincent Demoulin, Montfort sur Meu (FR); Patrick Fontaine, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 388 days.

(21) Appl. No.: 10/497,736

(22) PCT Filed: Nov. 20, 2002

(86) PCT No.: PCT/EP02/13031

§ 371 (c)(1),
(2), (4) Date: Nov. 18, 2004

(87) PCT Pub. No.: WO03/049323

PCT Pub. Date: Jun. 12, 2003

(65) Prior Publication Data
US 2005/0063496 A1    Mar. 24, 2005

(30) Foreign Application Priority Data
Dec. 6, 2001    (FR)    ................ 01 15892

(51) Int. Cl.
H03D 1/04    (2006.01)
(52) U.S. Cl. ........................ 375/346; 375/222
(58) Field of Classification Search ............ 375/346, 375/349, 222
See application file for complete search history.

(56) References Cited

U.S. PATENT DOCUMENTS

| 5,479,447 | A | * | 12/1995 | Chow et al. | 375/260 |
| 5,561,673 | A | * | 10/1996 | Takai et al. | 714/708 |
| 5,680,419 | A | * | 10/1997 | Bottomley | 375/347 |
| 5,740,526 | A |   | 4/1998  | Bonta et al. |  |
| 5,742,646 | A | * | 4/1998  | Woolley et al. | 375/349 |
| 6,009,122 | A | * | 12/1999 | Chow | 375/260 |
| 6,009,307 | A | * | 12/1999 | Granata et al. | 455/13.3 |
| 6,320,901 | B1| * | 11/2001 | Arad et al. | 375/222 |
| 6,973,296 | B2| * | 12/2005 | Webster et al. | 455/296 |

(Continued)

FOREIGN PATENT DOCUMENTS

EP    0757451    2/1997

(Continued)

OTHER PUBLICATIONS

Search report dated Jan. 22, 2003.

*Primary Examiner*—Juan A Torres
(74) *Attorney, Agent, or Firm*—Robert D. Shedd; Joseph J. Opalach; Brian J. Cromarty

(57) ABSTRACT

A method and device for evaluating a received signal in a data-receiving system using multi-carrier modulation are provided. A confidence indicator is determined for each data item received so as to provide a stream of confidence indicators parallel to the datastream received. The confidence indicators are ordered identical to the data received. A device for evaluating a confidence indicator for each carrier and a device for laying out a stream of confidence indicators identical to a datastream received are provided.

10 Claims, 3 Drawing Sheets

U.S. PATENT DOCUMENTS

Figure 1:
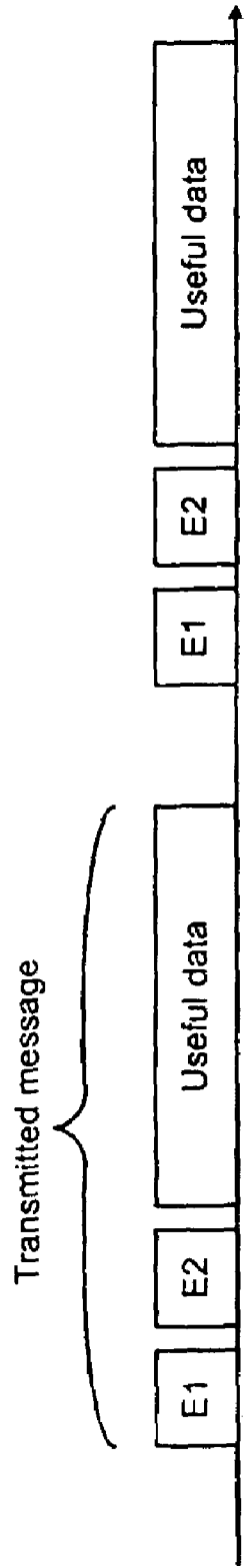

| | | | |
|---|---|---|---|
| 7,099,380 B1 * | 8/2006 | Feng et al. | 375/150 |
| 7,356,072 B1 * | 4/2008 | Feng et al. | 375/147 |
| 7,421,012 B1 * | 9/2008 | Feng et al. | 375/148 |

FOREIGN PATENT DOCUMENTS

| | | | |
|---|---|---|---|
| JP | 8-321716 | | 12/1996 |
| JP | 08321716 A | * | 12/1996 |
| JP | 2000-174726 | | 6/2000 |
| JP | 2000174726 A | * | 6/2000 |
| JP | 2000-188585 | | 7/2000 |
| JP | 2000188585 A | * | 7/2000 |
| JP | 2000-261405 | | 9/2000 |
| JP | 2000261405 A | * | 9/2000 |
| KR | 1999-0040394 | | 6/1999 |
| KR | 19990040394 | * | 6/1999 |
| KR | 10-0297350 | | 5/2001 |

* cited by examiner

METHOD AND DEVICE FOR SELECTING AN ANTENNA FOR RECEIPT OF A MULTI-CARRIER SIGNAL

CROSS-REFERENCE TO RELATED APPLICATION

This application claims the benefit, under 35 U.S.C. §365 of International Application PCT/EP02/13031, filed Nov. 20, 2002, which was published in accordance with PCT Article 21(2) on Jun. 12, 2003 in English and which claims the benefit of French patent application No. 0115892, filed Dec. 6, 2001.

FIELD OF THE INVENTION

The invention relates to a method of selecting a receiving path for a device having at least two receiving paths. The invention also relates to the receiving device comprising at least two receiving paths which uses the selection method.

BACKGROUND Of THE INVENTION

Some transmission systems use frequency bands which are very sensitive to interference. This is especially the case for systems operating at around 5 GHz. Many solutions are known to make the transmission useable. Among the known solutions, the use of multi-carrier modulation with information redundancy makes it possible to obtain good transmission performance. It is also known to use several antennas by selecting the one which receives the best quality signal on reception.

A known receiving system uses two switched antennas which use the same receiving channel. Provision is made to receive two successive test bursts in order to evaluate the two receiving paths before receiving a transmission burst. While on standby for reception, an evaluation circuit positions a switch in order to connect a first antenna to the input of an amplifier with automatic gain control. On receiving the first test burst, the power of the signal received in the evaluation circuit is measured. The power is measured by recovering the gain reference value of the amplifier with automatic gain control. The evaluation circuit then positions the switch in order to connect a second antenna to the input of the amplifier so as to measure the power received by the second antenna. At the end of the two test bursts, the evaluation circuit positions the switch on the antenna which corresponds to the strongest signal received.

In the case of multi-carrier modulation, it is possible that the distribution of the signal over the various carriers is not uniform. The measurement of total power of the signal may therefore not indicate the real performance of the transmission. Also, the selection of the receiving path may not be limited to the power of the signal received.

Another technique consists in using an error correction circuit so as to count the number of errors corrected for each path. However, such a technique requires an extremely long sequence in order to select the path. Now, increasing the time for evaluating the paths reduces the overall transmission bit rate. Furthermore, such an evaluation is made on a corrected error rate but does not make it possible to determine whether a path may be at the limit of the correctability.

SUMMARY OF THE INVENTION

The invention provides a method of evaluating a channel in a data-receiving system using multi-carrier modulation. A confidence indicator is determined for each data item received so as to provide a stream of confidence indicators parallel to the datastream received. The confidence indicators are ordered identical to the data received.

The invention is a method of selecting a receiving path for a device comprising at least two receiving paths in order to receive a signal modulated simultaneously over a plurality of carriers, each carrier transporting a sequence of symbols, all the symbols transmitted simultaneously over all the carriers forming a series of symbols, a separate evaluation of the receiving paths being carried out for at least one evaluation period. For each receiving path and for the evaluation period, a confidence indicator is determined for the signal corresponding to each carrier and to each symbol received, and the symbols received are then transformed into a bitstream to which a stream of confidence indicators is allocated, each confidence indicator being allocated to one bit of a received symbol, the stream of confidence indicators being ordered identical to the bitstream.

The term confidence indicator should be understood to mean a data item representing the receiving reliability of each carrier. Ideally, the confidence indicator is the signal-to-noise ratio of the carrier. Preferably, the confidence indicators correspond to power measurements for the carriers carried out during the demodulation of the carriers.

The stream of confidence indicators can be used with the help of sliding averages on the indicators associated with the data. The sliding averages are made on groups of confidence indicators corresponding to data packets which are smaller than the data packet simultaneously received so as to be representative of the error correctability.

Preferably, sliding averages are produced over a small number of confidence indicators, the small number being less than the total number of bits which can be transmitted simultaneously over the plurality of carriers, and the sliding averages serve to determine which is the best receiving path.

According to a first embodiment, a criterion for evaluating a path corresponds to the minimum sliding average obtained for a path in the evaluation period. Preferably, the path chosen corresponds to the highest minimum sliding average.

According to a second embodiment, for each path the mean power for receiving the signal is measured during the evaluation time, then the minimum sliding average is determined during the evaluation time, and the mean receiving power is combined with the minimum sliding average. The path is chosen as a function of the combination of the mean power with the minimum sliding average.

In order to eliminate any transitional period at the start of reception, the evaluation period corresponds to an evaluation burst and starts for one path after at least one symbol has been received on each carrier.

The invention is also a device for receiving a signal modulated over a plurality of carriers, each carrier transporting a sequence of symbols, all the symbols received simultaneously on the plurality of carriers forming a series of symbols. The device comprises at least two receiving paths, demodulation means for demodulating the symbols received by the various carriers, transcoding means for transforming the series of symbols received into a bitstream received, at least one means for determining a confidence indicator associated with each symbol for each carrier during the demodulation, at least one layout means for transforming the confidence indicators determined for each carrier into a stream of confidence indicators ordered identical to the bitstream, such that each confidence indicator is associated with one bit.

Preferably, the confidence indicator is a measurement of the carrier power, and the device comprises means for carrying out sliding averages on the confidence indicators.

Also, the device comprises a means for determining the minimum value of the sliding averages carried out during the evaluation period.

The invention will be better understood, and other particular features and advantages will become apparent on reading the following description, the description referring to the appended drawings among which:

DETAILED DESCRIPTION OF INVENTION

Figure 2:
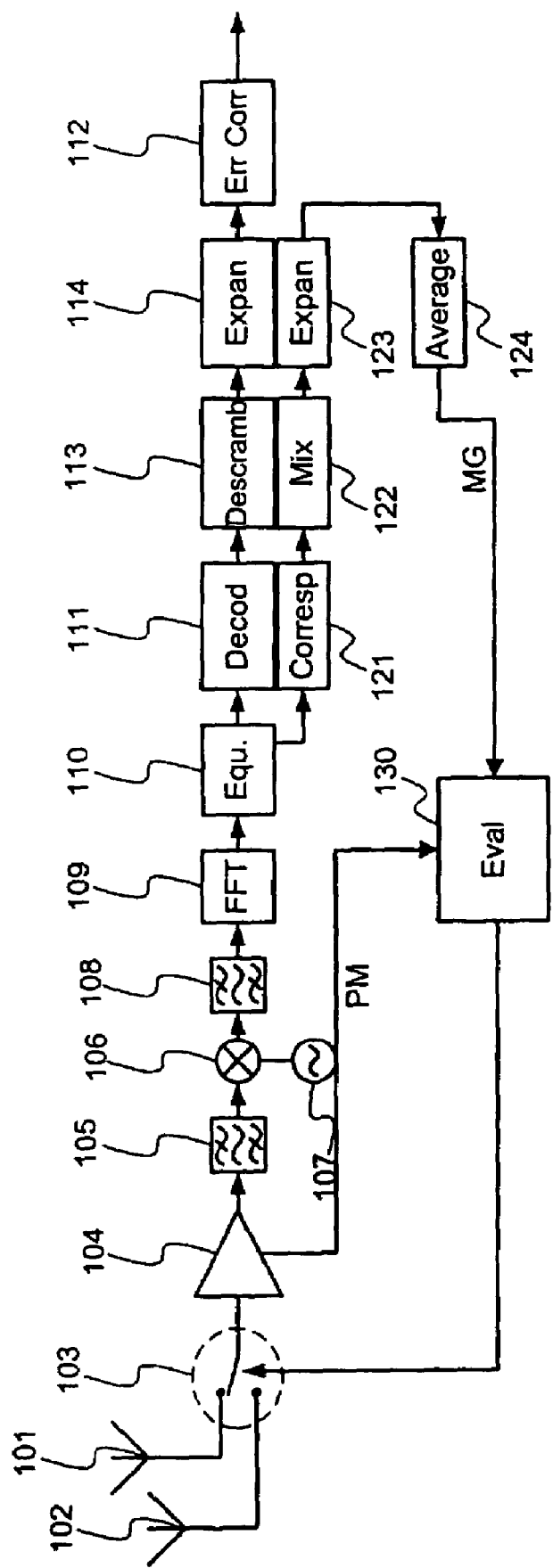
Figure 3:
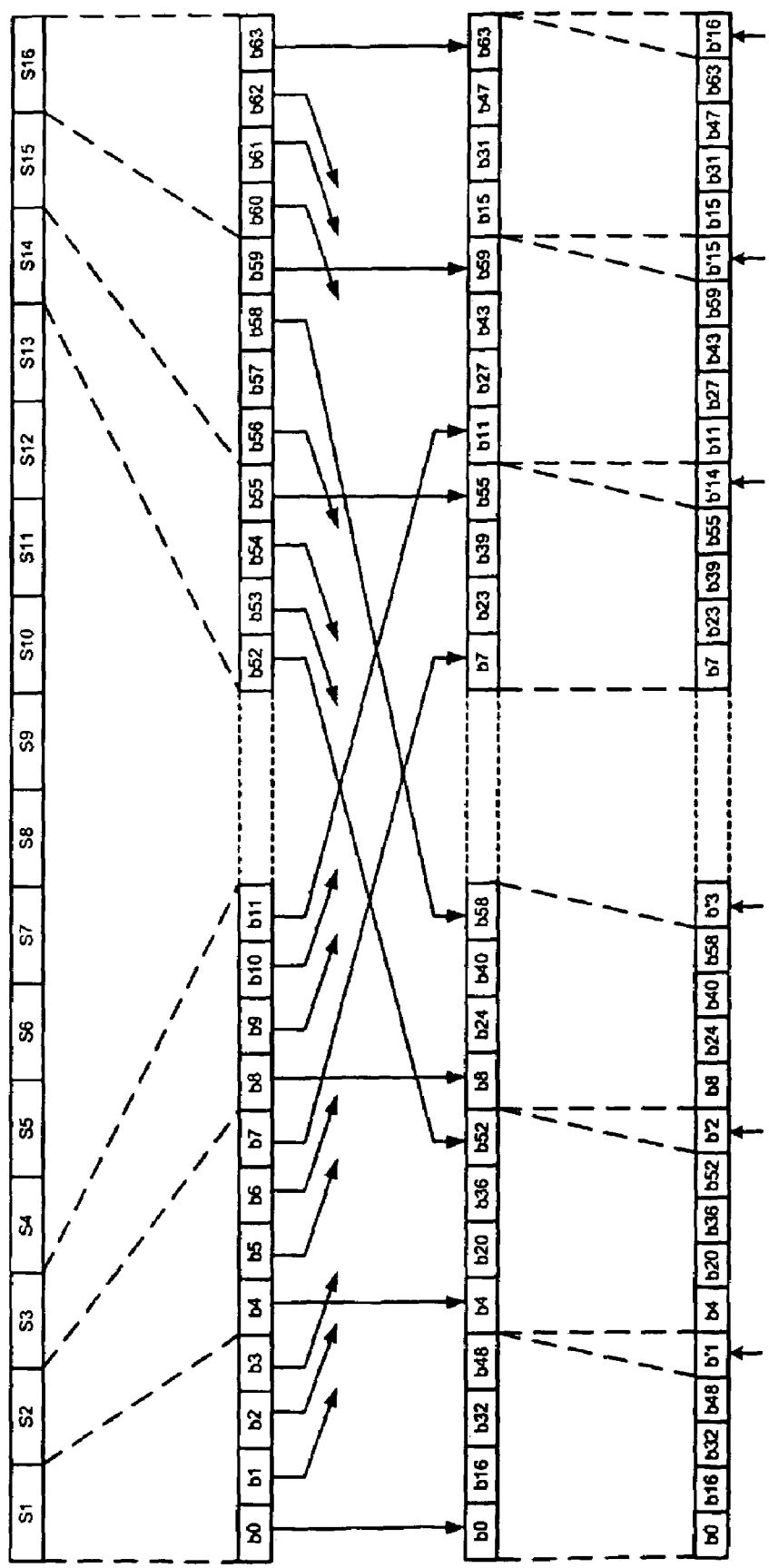
Figure 4:
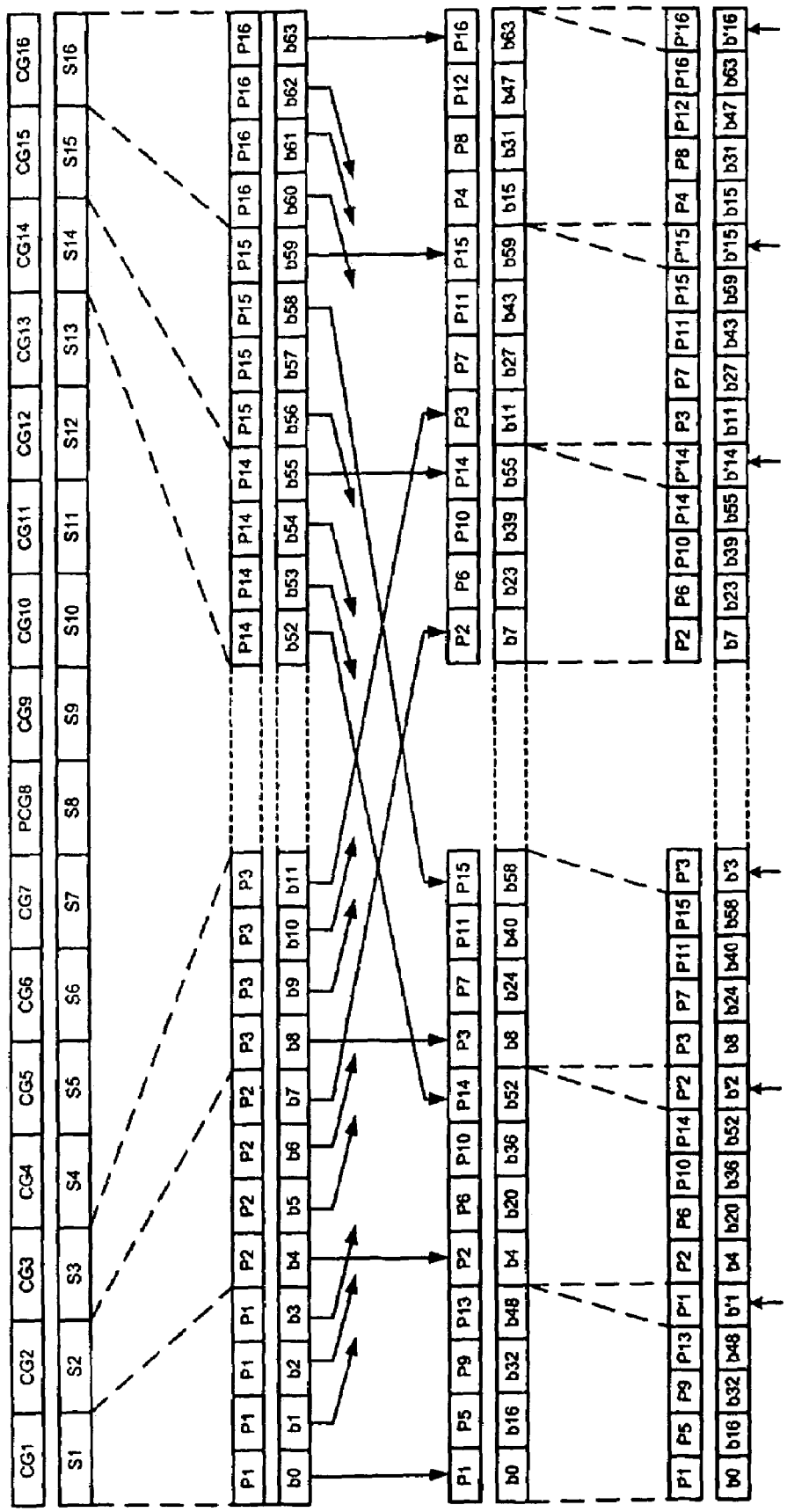

FIG. 1 shows a transmission sequence,

FIG. 2 shows a receiving device comprising two paths, according to the invention, FIG. 3 shows the operation of the receiving channel, and FIG. 4 shows the operation of the receiving channel when evaluating a receiving path. FIG. 1 shows the progress of a transmission sequence. The transmitted message is broken down into three bursts. A first burst E1 serves to evaluate a first receiving path and a second burst E2 serves to evaluate a second receiving path. A burst comprising useful data is then transmitted so as to be received on the best receiving path.

The bursts E1 and E2 are identical and of short duration so that the useful bit rate is not reduced. By way of example, the bursts E1 and E2 last 24 µs. The three bursts constituting the transmitted message are separated by a very short duration, for example 2 µs, so as to allow time to switch the receiving paths. The transmitted message may have a variable duration, for example at the most 5 ms, such that the evaluation of the two paths at the start of the transmission is valid to the end thereof. If the propagation conditions allow, the duration of the transmitted message may be longer.

The device of FIG. 2 shows a device for receiving a multi-carrier modulated signal, better known by the name OFDM (Orthogonal Frequency Division Multiplex) modulation. In our example, the number of carriers is n, where n is, for example, an integer equal to 16. The n carriers are simultaneously phase- and amplitude-modulated so that each can transport a symbol. By way of example, the modulation used on each carrier is, for example, of QAM (Quadrature Amplitude Modulation) type by using a constellation of 16 points, which corresponds to a symbol defined by 4 bits. The number of carriers, the number of points and the type of constellation may be modified depending on the needs of a person skilled in the art.

The receiving device uses two receiving paths which correspond respectively to antennas 101 and 102. The antennas 101 and 102 are separated by a distance such that the combinations of echoes of the signal to be received are different, by way of example the distance is for example 5 cm for a mean wavelength of the signal received of about 6 cm. Such a device makes it possible to reduce transmission faults associated with echoes since it increases the probability of good reception for at least one antenna. The addition of other antennas further improves the probability of good reception, but, for reasons of simplicity of operation, a limit of two antennas is preferred.

The use of several antennas requires increasing the receiving channels. However, it is known to use a common receiving channel in order to limit costs. Each path is evaluated sequentially on receiving the evaluation bursts E1 and E2 coming from an emitter which must send useful data. The number of evaluation bursts is equal to the number of antennas and therefore of possible paths for the waves. The switch 103 makes it possible to select which antenna 101 or 102 is connected to the receiving channel.

An amplifier 104 constitutes the first element of the receiving channel whose input is connected to one of the antennas 101 or 102 via the switch 103. The amplifier 104 is an amplifier with automatic gain control which supplies to a first output the amplified input signal up to a predetermined power level, and to a second output gain reference value information representative of the amplification carried out between the input and the output in order to obtain the predetermined power level.

A first filter 105 is connected to the amplifier 104 in order to select the useful band. A mixer 106 and an oscillator 107 transpose the useful band into the base band. A second filter 108 selects only the base band so as to remove the image frequencies resulting from the transposition. A computing circuit 109 carries out an analog/digital conversion of the signal coming out of the second filter and carries out a Fast Fourier Transform (FFT). The computing circuit 109 supplies n signals representative of each of the n carriers.

An equalization circuit 110 individually filters each of the n signals. A decoding circuit 111 decodes each signal while combining a symbol corresponding to the constellation used for the modulation therewith. The decoding circuit 111 supplies, to the equalization circuit 110, the difference between the decoded symbol and the corresponding ideal symbol. The equalization circuit 110 modifies the filtering characteristics of the filters so as to individually optimize the signal on each carrier. The decoding circuit 111 transforms the symbols received into a bitstream at an error correction circuit 112. The bitstream may be transmitted in series or in parallel over a variable number of conducting wires.

The computing circuit 109, the equalization circuit 110 and the decoding circuit 111 form a demodulation circuit. In our example, the elements of the modulation circuit are shown separately but it is possible that these elements are intermixed to a greater or lesser degree. It is also possible that these elements are partly duplicated so as to optimize the demodulation.

In order to optimize the transmission, elements may be added. A descrambler 113 may be placed between the decoding circuit 111 and the error correction circuit 112. The descrambler 113 serves to mix the bits received by various carriers using mix 122. Such a circuit is used when the bits transmitted are mixed between the carriers so as to strengthen the immunity with respect to a noise source covering several carriers.

An expansion circuit 114 may be added between the decoding circuit 111 and the error correction circuit 112. The expansion circuit 114 serves to add redundant bits which have been removed on transmission. The suppression of redundant bits has the effect of reducing the error correction performance. Such a device reduces the resistance to errors of an error correction code but makes it possible to have a higher data bit rate.

The descrambler 113 and the expansion circuit 114 are shown as two separate circuits in order to improve understanding. It is possible to produce a single circuit carrying out both functions simultaneously.

The elements described above are known to a person skilled in the art and may be replaced by other equivalent structures.

By way of example, FIG. 3 illustrates the operation of the device described when receiving a series of symbols S1 to S16. In the example described, the series of symbols S1 to S16 corresponds to that which a person skilled in the art would commonly call an OFDM symbol which includes all the symbols transmitted simultaneously over all the carriers used for the transmission. At the output of the equalizer 110, sixteen carriers transporting the symbols Si to S16 are provided for the decoding circuit 111. The decoding circuit 111 identifies the symbols and makes 4 bits correspond to each one, thus providing 64 bits b0 to b63. The descrambler 113 modifies the order of the bits such that successive bits always come from carriers separated from each other so as to reduce the effect of noise localized to one carrier. The expansion circuit 114 adds, for example, sixteen uniformly distributed bits b'1 to b'16, which correspond to the locations of bits removed during the transmission. The added bits b'1 to b'16 are fixed arbitrarily and are considered false. The bitstream thus formed is then presented to the error correction circuit 112.

The error correction circuit 112 is, for example, a Viterbi decoder which uses a convolutional code. The bitstream is received in series by the error correction circuit which provides a bitstream corrected in series. Each bit of the stream of corrected bits corresponds to a convolution carried out over a certain bit number of the incoming bitstream, for example 16 bits. The corrected bitstream comprises a smaller number of bits resulting from the suppression of redundant bits. By way of example, it is common with such an error correction type to use a redundant number of bits equal to the number of bits to be transmitted.

When a new series of symbols is received, it undergoes the same processing as indicated above. The bitstream resulting from receiving several series of symbols are subsequently made to form a single bitstream.

In order to evaluate a path according to the invention, reference will presently be made to FIGS. 2 and 4 simultaneously. FIG. 4 corresponds to the diagram of FIG. 3 by taking into account the path evaluation. The equalization circuit 110 provides the n gain reference points CG1 to CG16 of the filters which supply the n filtered signals, respectively. A correspondence circuit 121 fabricates a stream of power information P1 to P16 for which one bit is associated with each item of power information.

A mixing circuit reorganizes the power information identical to the descrambler 113 so as to organize the stream of power information in the same order as the bitstream. A parallel expansion circuit 123 adds additional power information P'1 to P'16 in correspondence with each added bit b'1 to b'16 via the expansion circuit 114. The additional power information P'1 to P'16 is equal to zero since the added bit is potentially false and the confidence which can be assigned to it is zero. The power information linked to receiving a series of symbols is subsequently put with the previous stream of power information in order to form only a single stream of power information.

A computing circuit 124 receives the power information in the same order as the bits received by the error correction circuit 112. The computing circuit 124 produces sliding averages MG on the power information. The term sliding average should be understood to mean the production of as many averages as information items contained in the information stream, each average being made over a significant number of successive items of power information. The term significant number should be understood to mean the number of successive bits which, if they are false, leads to a risk of having uncorrected errors. For a correction circuit using a convolutional code taking into account 16 successive bits, the ideal is to produce sliding averages on 16 successive items of power information. However, good results are obtained by using sliding averages over only 6 items of power information.

The various sliding averages MG are supplied to an evaluation circuit 130 which determines the reception quality of the path from sliding averages carried out during the evaluation period. Several methods are possible. Preferably, it is sought to determine the path which has the least chance of "unlatching" during a transmission. To this end, during an evaluation burst E1 or E2 of a path, the minimum value of the sliding averages produced for the path evaluated is stored. Once both paths are evaluated, the evaluation circuit selects the path whose minimum value is highest.

To evaluate a path, it is preferable to be able to test all the series of bits which correspond to a different layout of the carriers. The reception of a single series of symbols may therefore be enough. On the other hand, the reception of a first series of symbols may not be representative of a transmission path, this is especially the case when switching the paths and when adjusting the equalization circuit terminated for the path which is being tested. Preferably, evaluation of the receiving path starts after receiving a few series of symbols, for example three series. When the receiving channels are completely dissociated, such considerations may be ignored.

Evaluation of the path thus carried out reflects the probability of error of a bit group before correction. Thus the path is chosen so as to minimize the probability of error which cannot be corrected.

The invention may be improved by combining the mean receiving power. The mean receiving power is obtained by recovering the gain reference point of the amplifier 104. The evaluation circuit combines, for each path, the mean receiving power with the minimum sliding average value.

By way of example, an evaluation parameter PE is calculated for each path by means of the formula:

$$PE = PM + K \times MGmin$$

PM is the mean receiving power (expressed in dB) obtained using the amplifier 104 during the path evaluation period. MGmin is the minimum of the sliding averages (expressed in dB) during the channel evaluation period. K is a weighting coefficient which serves to balance the weight of the term MGmin with respect to the weight of the term PM.

As indicated above, the mean receiving power of each path is not sufficiently significant to carry out the choice of path since the latter does not take into account the receiving power of each carrier. On the other hand, if it is desired to measure exactly the power of each carrier, the measurement is distorted by the amplifier 104. The coefficient K serves to balance the taking into account of the mean power which is carried out on receiving a series of symbols corresponding, in our example, to 64 bits, while the sliding average corresponds to 6 to 16 bits.

The exemplary embodiment corresponds to a preferred embodiment which may be adapted by a person skilled in the art according to different variants. In the embodiment described, the two receiving paths use a receiving channel which is common except at the antennas. A person skilled in the art may switch the receiving paths to different locations of the receiving channel. If the receiving channel is duplicated from the antenna to the equalization circuit, the two receiving paths can be evaluated simultaneously for the same evaluation period. It is then appropriate to duplicate all the elements serving in the extraction and preparation of the stream of power information.

In the preferred example, sliding averages are produced in order to obtain a simple and effective evaluation. It is however possible to treat the stream of power information differently, the important thing being to be able to carry out a comparison of the receiving paths based on a stream of power information representative of the bitstream received.

In the example described, the evaluation is carried out over a power measurement associated with each bit. The important thing in the invention is to evaluate the paths using a confidence indicator associated with each bit so as to reflect the real error probability of a path. The use of power information makes it possible to have a relatively reliable indicator. The power measurement may be replaced by another parameter such as the signal/noise ratio of each carrier which is even more significant but which is more complex and therefore more expensive to implement.

Another variant, making it possible to have more accuracy, consists in using a function representative of the loss of performance as a function of the power. Such a function may be used on each power information item or directly on the sliding averages or else solely on the minimum sliding average. By way of example, it is possible to use an evaluation parameter PE' of the type:

$$PE'=PM+F(MGmin)$$

where F(x) is a function giving the performance loss observed for a given power information average as a result.

More generally, the example describes a transmission device of the OFDM type over 16 carriers using a modulation of the QAM16 type on each carrier. The number of carriers changes nothing in the invention. Similarly, it is possible to use any type of modulation on the carriers and, in the case of modulations in constellation, any number of points.

The invention claimed is:

1. Method of evaluating received signals for a device comprising:
   receiving a signal modulated simultaneously over a plurality of carriers, each carrier transporting a sequence of symbols, all the symbols transmitted simultaneously over all the carriers forming a series of symbols, separately evaluating the signal received by both a first antenna and a second antenna along a common evaluation path, the evaluation for the signal received at each of the first and second antennas being carried out for at least one evaluation period, wherein, for the evaluation period:
   a confidence indicator is determined for the signal corresponding to each carrier and to each symbol received,
   the symbols received are then transformed into a bitstream to which a stream of confidence indicators is allocated, each confidence indicator being allocated to a bit of a received symbol, the stream of confidence indicators being ordered identical to the bitstream,
   sliding averages are then determined, the sliding averages being obtained from a number of confidence indicators from said stream of confidence indicators, this number being less than the total number of bits which can be transmitted simultaneously over the plurality of carriers, and
   selecting one of the first and second antennas according to the separate evaluation for the signal received at each of the first and second antennas.

2. Method according to claim 1, wherein the confidence indicators correspond to power measurements for the carriers carried out during the demodulation of the carriers.

3. Method according to claim 1, wherein sliding averages are produced over a small number of confidence indicators, the small number being less than the total number of bits which can be transmitted simultaneously over the plurality of carriers, and in that the sliding averages serve to determine which is the strongest signal received at each of the first and second antennas.

4. Method according to claim 3, wherein a criterion for evaluating a received signal corresponds to the minimum sliding average obtained for a signal in the evaluation period.

5. Method according to claim 4, wherein the selected antenna corresponds to the antenna with the signal with the highest minimum sliding average.

6. Method according to claim 3, wherein, for the signal received by both the first and second antennas:
   the mean power for receiving the signal is measured during the evaluation time,
   the minimum sliding average is determined during the evaluation time,
   the mean receiving power is combined with the minimum sliding average, and in that the first or second antenna is selected as a function of the combination of the mean power with the minimum sliding average.

7. Method according to claim 1, wherein the evaluation period corresponds to an evaluation burst and starts after at least one symbol has been received on each carrier.

8. Device for receiving a signal modulated over a plurality of carriers, each carrier transporting a sequence of symbols, all the symbols received simultaneously on the plurality of carriers forming a series of symbols, the device comprising:
   a first antenna for receiving the signal;
   a second antenna for receiving the signal;
   an evaluation path;
   a switch for selectively connecting the first and second antennas to the evaluation path;
   the evaluation path comprising:
   demodulation means for demodulating the symbols received by the various carriers;
   transcoding means for transforming the series of symbols received into a bitstream received;
   at least one means for determining a confidence indicator associated with each symbol for each carrier during the demodulation;
   at least one layout means for transforming the confidence indicators determined for each cater into a stream of confidence indicators ordered identical to the bitstream, such that each confidence indicator is associated with a bit; and
   means for determining a sliding average obtained from a number of confidence indicators from said stream of confidence indicators, this number being less than the total number of bits which can be transmitted simultaneously over the plurality of carriers;
   the switch being controlled to select one of the first and second antennas according to a separate evaluation of the signal received at each of the first and second antennas.

9. Device according to claim 8, wherein the confidence indicator is a measurement of the cater power, and in that the device comprises means for carrying out sliding averages on the confidence indicators.

10. Device according to claim 9, wherein the evaluation path comprises a means for determining the minimum value of the sliding averages carried out during the separate evaluation.

* * * * *